(12) United States Patent
He et al.

(10) Patent No.: US 9,960,934 B2
(45) Date of Patent: May 1, 2018

(54) CHANNEL ESTIMATION FOR FBMC MODULATION

(71) Applicant: Telefonaktiebolaget L M Ericsson (publ), Stockholm (SE)

(72) Inventors: Ning He, Sollentuna (SE); Robert Baldemair, Solna (SE); Ather Gattami, Stockholm (SE); Anders Hansson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 142 days.

(21) Appl. No.: 14/893,850

(22) PCT Filed: Nov. 5, 2015

(86) PCT No.: PCT/EP2015/075781
§ 371 (c)(1),
(2) Date: Nov. 24, 2015

(87) PCT Pub. No.: WO2017/076448
PCT Pub. Date: May 11, 2017

(65) Prior Publication Data
US 2017/0230202 A1 Aug. 10, 2017

(51) Int. Cl.
*H04L 25/02* (2006.01)
*H04L 27/26* (2006.01)
*H04L 27/36* (2006.01)

(52) U.S. Cl.
CPC ...... *H04L 25/0204* (2013.01); *H04L 25/0236* (2013.01); *H04L 27/264* (2013.01);
(Continued)

(58) Field of Classification Search
CPC ............. H04L 25/0204; H04L 25/0236; H04L 27/264; H04L 27/2649; H04L 27/2698; H04L 27/366
See application file for complete search history.

(56) References Cited

U.S. PATENT DOCUMENTS

| 9,674,024 B2* | 6/2017 | Lin ..................... H04L 27/2692 |
| 2009/0213949 A1 | 8/2009 | Javaudin |

(Continued)

FOREIGN PATENT DOCUMENTS

WO 2015128420 A1 9/2015

OTHER PUBLICATIONS

LèLè, C. et al., "Channel estimation methods for preamble-based OFDM/OQAM modulations", European Transactions on Telecommunications, Wiley & Sons, Chichester, GB, vol. 19 No. 7, Nov. 1, 2008, 741-750.

(Continued)

*Primary Examiner* — Freshteh N Aghdam
(74) *Attorney, Agent, or Firm* — Murphy, Bilak & Homiller, PLLC

(57) ABSTRACT

Channel estimation with reduced overhead in a filter bank multi-carrier (FBMC) system is enabled by use of frequency-time blocks each comprising a pilot field with two pilot symbols and data symbols outside the pilot field. In embodiments, nearest neighbors of the pilot field are populated with data symbols which fulfill one or more symmetry relations enabling approximate interference cancellation. In a first embodiment, the pilot field consists of two frequency-consecutive and time-coinciding positions; the pilot field may be time-initial in a transmission or may be located in the interior of the transmission. In a second embodiment, a block comprises two frequency-coinciding and time-consecutive pilot symbols; the pilot field may be frequency-initial in a transmission or may be located in the interior of the transmission.

16 Claims, 2 Drawing Sheets

(52) U.S. Cl.
CPC ...... *H04L 27/2649* (2013.01); *H04L 27/2698* (2013.01); *H04L 27/366* (2013.01)

(56) References Cited

U.S. PATENT DOCUMENTS

| | | | |
|---|---|---|---|
| 2009/0268837 A1* | 10/2009 | Kimura | H04L 5/0007 375/267 |
| 2017/0026215 A1* | 1/2017 | Zhao | H04L 25/0224 |
| 2017/0099172 A1* | 4/2017 | Ren | H04L 27/264 |

OTHER PUBLICATIONS

Yoon, Taewoong et al., "Pilot Structure for high Data Rate in OFDM/OQAM-IOTA System", Vehicular Technology Conference, 2008 IEEE, 2008, 1-5.

Farhang-Boroujeny, B., "OFDM Versus Filter Bank Multicarrier (Development of Broadband Communication Systems)", IEEE Signal Processing Magazine, May 2011, pp. 92-112.

Kofidis, E. et al., "Preamble-Based Channel Estimation in OFDM/OQAM Systems: A Review", Signal Processing, vol. 93, 2013, pp. 2038-2054.

\* cited by examiner

CHANNEL ESTIMATION FOR FBMC MODULATION

TECHNICAL FIELD

The present application relates generally to channel estimation in filter bank multi-carrier (FBMC) modulation, and specifically discloses signal structures with interference-canceling properties suitable for such channel estimation.

BACKGROUND

In filter bank multi carrier (FBMC) transmission, the transmitted signal is given by $$s(t) = \sum_{n=0}^{N-1} \sum_{k=0}^{K-1} d_{k,n} j^{\frac{(k+n)\pi}{2}} g\left(t - \frac{nT}{2}\right) e^{j2\pi kFt}, \quad (1)$$

where the prototype filter g(t) is the information carrying pulse (or Nyquist pulse), $d_{k,n}$ are real data symbols, K is the number of subcarriers, N is the number of pulses per transmitted FBMC symbol duration, and t=0, 1, . . . , KN−1. The prototype filter, which may be chosen real and symmetric, is at the focus of design efforts. For instance, side lobes of a purposefully designed FBMC prototype filter may be significantly smaller than those in orthogonal frequency division multiplexing (OFDM), and FBMC may allow for transmitting signals with a spectrum that can be pre-specified within wide bounds.

FBMC modulation may be superior to cyclically prefixed (CP) OFDM as regards one or more of flexibility, spectral efficiency and spectral containment, both in wired and wireless applications. FBMC/OQAM or OFDM/OQAM, where offset quadrature amplitude modulation (OQAM) is employed, has attracted recent interest. Kofidis et al., "Preamble-based channel estimation in OFDM/OQAM systems: A review", *Signal Processing*, vol. 93 (2013), pp. 2038-2054, discusses the channel estimation problem for such systems.

Channel estimation may be based on known symbols (or pilot symbols) transmitted at known frequency-time (FT) positions of a signal. A block containing one or more pilot symbols may be referred to as a preamble or midamble depending on its position in a frame-segmented signal; so-called scattered pilot symbols are located at isolated FT positions. By comparing received pilot symbols (as decoded from their known positions) and comparing them with their known values, a receiving side may gain knowledge of current channel characteristics. While the pilot symbols represent overhead in a communication system, it can be shown that their number is bounded below as a function of the modulation scheme and current radio conditions.

A difficulty associated with channel estimation in the FBMC/OQAM setting is related to the fact that, while the subcarrier functions are orthogonal in the real field, there is an intrinsic imaginary interference among subcarriers and symbols. Kofidis et al. reviews known approaches to this difficulty, including a direct approach for low-noise conditions ("pairs-of-pilots" method), interference avoidance (by nulling data surrounding the pilot symbols) and interference approximation (by pairwise approximate cancellation of interference terms). Interference approximation is based on an assumption of approximate constancy of the channel and further on knowledge regarding interference weights for the neighbors of each FT point of interest; Kofidis et al. attempts to prove symmetry relations applying between the interference weights. In the interference approximation method, some neighboring symbols are repeated (with same or different phase) in view of the symmetry relations, and so cannot be used for data transmission without constraints. It would be desirable to reduce the system overhead devoted to channel estimation.

SUMMARY

Accordingly, it is an object of the present invention to propose channel estimation techniques, including transmitter-side and/or receiver-side methods and/or apparatus configured to perform such methods, that are associated with a reduced overhead. In particular, it is an object to propose a channel estimation signal which, in comparison with available channel estimation techniques, includes an increased number of independently assignable data symbols. Specifically, it is an object to propose a channel estimation signal which, in comparison with available channel estimation techniques, includes an increased number of independently assignable data symbols that are nearest neighbors of the pilot symbols.

A wireless or wired communication network utilizing FBMC modulation with a real symmetric pulse is considered. Channel estimation at a second node of the communication system receives from a first node a FBMC-modulated signal comprising data symbols and predetermined pilot symbol(s). The second node may rely upon knowledge of the predetermined pilot symbol(s) to perform channel estimation.

Throughout this disclosure and the claims, "real symmetric pulse" is to be understood as a pulse having constant argument. More specifically, the invention is applicable in any FBMC-modulated network having a pulse g(t) as long as g is symmetric and arg g(t)=θ is constant for all t. For purposes of all embodiments disclosed herein, such a network is equivalent to one with real symmetric pulse after substituting symbols as per $d_{n,k} \mapsto e^{-i\theta} d_{n,k}$. Accordingly, those embodiments may be implemented in FBMC-modulated networks having a symmetric pulse with constant argument without departing from the scope of the invention.

The inventors have determined that in a system utilizing FBMC/OQAM modulation with real symmetric pulse, the correct symmetry relations applying between interference weights around the transfer function matrix element $G_{n,k}$ at position (n, k) are as follows:

$$-(-1)^n \delta - \beta(-1)^n \delta$$
$$-(-1)^n \gamma G_{n,k} (-1)^n \gamma$$
$$-(-1)^n \delta \beta (-1)^n \delta \quad (2)$$

where β, γ, δ are real positive numbers, n is a time index (rows) and k is a frequency index (columns). Accordingly, two symbols transmitted at frequency-consecutive positions will experience interference generated by identical sets of interference weights, while six of the interference weights will change signs between time-consecutive symbols. As used herein, "consecutive" means immediately consecutive.

In one embodiment, the first node generates the signal to be transmitted in such manner that the signal includes a predetermined pilot field populated with two pilot symbols and that at least two nearest neighbors of the pilot field are populated with data symbols which fulfill a symmetry relation. The inventors have determined that, if at least some nearest neighbors fulfill one or more of the symmetry relations to be described below and if the channel gain H of the channel is assumed to be locally slowly varying, the sum of the demodulated signals for two time-consecutive positions is approximately given by:

$$y_{n,k}+y_{n+1,k} \approx H(d_{n,k}(G_{n,k}-\beta)+d_{n+1,k}(G_{n+1,k}+\beta))+w_0 \quad (3)$$

and the sum of the decoded signal for two frequency-consecutive positions is given by:

$$y_{n,k}+y_{n,k+1} \approx H(d_{n,k}(G_{n,k}-\beta)+d_{n,k+1}(G_{n,k+1}+\beta))+w_0 \quad (4)$$

where $d_{n,k}$ is the predetermined pilot symbol at position (n, k), $w_0$ denotes measurement noise, and $\beta$ and $G_{n,k}$ are as above. The channel estimation problem can be completed using per se known methods on the basis of the sum of the decoded signal and the predetermined pilot symbols by which it was generated. In particular, it is possible to eliminate the real positive interference weight $\beta$ and to control the impact of the measurement noise $w_0$. In some embodiments, the two pilot symbols are real and imaginary parts of a complex pilot symbol.

Each of the symmetry conditions to be described below is effective on its own in reducing interference. The interference is typically reduced further (so that the two approximations (3) and (4) above are improved) if an additional symmetry condition is imposed. Yet there is no absolute need for data symbols neighboring the pilot field to fulfill all of the symmetry conditions. In one embodiment, the proportion of neighboring data symbols to fulfill a symmetry relation may be determined on the basis of a signal quality metric, such as signal-to-interference-and-noise ratio (SINR) or signal-to-noise ratio (SNR). A relatively lower value of the signal quality metric may suggest that a relatively greater proportion may be advisable in some circumstances; yet if the SNR/SINR is already very poor, the limited amount of additional interference due to imperfect cancellation is of little consequence, and so the proportion of neighboring data symbols fulfilling a symmetry relation may be reduced.

The pilot symbols may be consecutive in frequency and coinciding in time $(d_{n,k}, d_{n,k+1})$ or coinciding in frequency and consecutive in time $(d_{n,k}, d_{n+1,k})$. One symmetry relation requires such nearest neighbors which precede and succeed the pilot field in its longitudinal direction to be populated with a same data symbol. As used herein, the longitudinal direction of the pilot field represents frequency if the two pilot symbols are consecutive in time; alternatively, if the two pilot symbols are consecutive in time, the longitudinal direction represents time. For purposes of illustration, the symmetry relation may be expressed by the following formulas, which apply for time-consecutive and frequency-consecutive pilot symbols, respectively:

$$\begin{array}{cccc} * & a & * & \\ * & d_{n,k} & * & \\ * & d_{n+1,k} & * & \\ * & a & * & \\ \end{array}$$

$$\begin{array}{cccc} * & * & * & * \\ a & d_{n,k} & d_{n,k+1} & a \\ * & * & * & * \\ \end{array}$$

where a denotes a data symbol which is required to be identically repeated at both positions. It is emphasized that the data symbol a may itself have any value and can thus be used for transmitting data. In the formulas, * denotes an independently assignable data symbol, which may or may not fulfill a symmetry relation. In embodiments where the pilot field is frequency-initial or time-initial, the data symbols denoted by * may even be non-existent or outside the transmission. Neither this nor the subsequent symmetry relations place any condition on surrounding positions, i.e., on not-nearest neighbors of the pilot field.

In embodiments where the pilot field is neither frequency-initial nor time-initial in a transmission, one symmetry relations stipulates that such four nearest neighbors, which are adjacent to the pilot field in both time and frequency, are populated with three independent data symbols and one data symbol which is given by a function of the three independent data symbols. For purposes of illustration, the symmetry relation may be expressed by either of the following formulas, for the cases where the pilot symbols are coinciding in frequency and consecutive in time and consecutive in frequency and coinciding in time, respectively:

$$\begin{array}{ccc} b_1 & * & b_2 \\ * & d_{n,k} & * \\ * & d_{n+1,k} & * \\ b_3 & * & \phi(b_1, b_2, b_3) \\ \end{array}$$

where the function $\varphi(b_1,b_2,b_3)=-b_1+b_2+b_3$, $$\begin{array}{cccc} b_1 & * & * & b_3 \\ * & d_{n,k} & d_{n+1,k} & * \\ b_2 & * & * & \sigma(b_1, b_2, b_3) \\ \end{array}$$

where the function $\sigma(b_1,b_2,b_3)=b_1+b_2-b_3$. Here, each of $b_1,b_2,b_3$ denotes an independent data symbol, i.e., a data symbol which may have any value and may therefore carry payload information. If for some reason it is desired to locate the independent data symbols in other positions, this may be achieved by a simple change of variables. For instance, by letting $B_1=\varphi(b_1,b_2,b_3)$, $B_2=b_2$ and $B_3=b_3$, one obtains the equivalent symmetry relation $$\begin{array}{ccc} \phi(B_1, B_2, B_3) & * & B_2 \\ * & d_{n,k} & * \\ * & d_{n+1,k} & * \\ B_3 & * & B_1 \\ \end{array}$$

with function $\varphi$ as defined above and $B_1$, $B_2$, $B_3$ being independent data symbols.

In embodiments where the pilot symbol is frequency-initial and the pilot symbols are consecutive in time, one symmetry relation stipulates that such nearest neighbors, which are adjacent to the pilot field in frequency and coinciding with the pilot field in time, are populated with a same data symbol. For purposes of illustration, the symmetry relation may be expressed by the following formula:

$$\begin{array}{cc} * & * \\ d_{n,0} & c \\ d_{n+1,0} & c \\ * & * \\ \end{array}$$

where c denotes a data symbol which is repeated identically in the above two positions but which is itself independently assignable. Positions to the left of (corresponding to lower frequency indices than) the pilot symbols are outside the transmission in the sense they do not significantly contribute to interference at positions in the pilot field.

In embodiments where the pilot field is frequency-initial in a transmission and the pilot symbols are consecutive in time, one symmetry relation stipulates that such nearest neighbors, which are adjacent to the pilot field in both frequency and time, are populated with a same data symbol. For purposes of illustration, the symmetry relation may be expressed by the following formula:

$$\begin{array}{cc} * & b \\ d_{n,0} & * \\ d_{n+1,0} & * \\ * & b \end{array}$$

where b denotes a data symbol which is repeated identically in the above two positions but which is itself independently assignable. Again, positions to the left of (corresponding to lower frequency indices than) the pilot symbols are outside the transmission in the sense they do not significantly contribute to interference at positions in the pilot field.

In embodiments where the pilot field is neither frequency-initial nor time-initial in a transmission, and the pilot symbols are consecutive in time, one symmetry relation stipulates that such nearest neighbors, which are adjacent to the pilot field in frequency and coinciding with the pilot field in time, are populated with three independent data symbols and one data symbol which is given by a function of the three independent data symbols. For purposes of illustration, the symmetry relation may be expressed by the following formula:

$$\begin{array}{ccc} * & * & * \\ c_1 & d_{n,k} & c_2 \\ c_3 & d_{n+1,k} & \psi(c_1, c_2, c_3) \\ * & * & * \end{array}$$

where $c_1$, $c_2$, $c_3$ denote independently assignable data symbols and function $\psi(c_1,c_2,c_3)=-c_1+c_2+c_3$. As noted above, the independently assignable data symbols may be rearranged by a change of variables.

In embodiments where the pilot field is time-initial in a transmission and the pilot symbols are consecutive in frequency, one symmetry relation stipulates that such nearest neighbors, which are coinciding with the pilot field in frequency and adjacent to the pilot field in time, are populated with data symbols of equal magnitudes and opposite phases. For purposes of illustration, the symmetry relation may be expressed by the following formula:

$$\begin{array}{ccc} * & d_{0,k} & d_{0,k+1} & * \\ * & c & -c & * \end{array}$$

where c denotes a data symbol which is repeated with opposite phases in the above two positions but which is itself independently assignable. Positions above (corresponding to lower time indices than) the pilot symbols are outside the transmission in the sense they do not significantly contribute to interference at positions in the pilot field.

In a further development of the preceding embodiment, one symmetry relation stipulates that such nearest neighbors, which are adjacent to the pilot field in both frequency and time, are populated with one independent data symbol and one data symbol which is given by a function. The function depends on said independent data symbol and on those data symbols which (i) populate said nearest neighbors, (ii) coincide with the pilot field in frequency and (iii) are adjacent to the pilot field in time. For purposes of illustration, the symmetry relation—together with the one according to the preceding embodiment—may be expressed by the following formula:

$$\begin{array}{cccc} * & d_{0,k} & d_{0,k+1} & * \\ b & c & -c & \eta(b, c) \end{array}$$

where b is an independently assignable data symbol and function $\eta(b,c)=b+2c$. The independently assignable data symbols may be rearranged by a change of variables.

In embodiments where the pilot field is neither frequency-initial nor time initial in a transmission, and the pilot symbols are consecutive in frequency, one symmetry relation stipulates that such nearest neighbors, which are coinciding with the pilot field in frequency and adjacent to the pilot field in time, are populated with three independent data symbols and one data symbol which is given by a function of the three independent data symbols. For purposes of illustration, the symmetry relation may be expressed by the following formula:

$$\begin{array}{cccc} * & c_1 & c_3 & * \\ * & d_{n,k} & d_{n+1,k} & * \\ * & c_2 & \rho(c_1, c_2, c_3) & * \end{array}$$

where $c_1,c_2,c_3$ are independently assignable data symbols and function $\rho(c_1,c_2,c_3)=c_1-c_2+c_3$. The independently assignable data symbols may be rearranged by a change of variables.

As already noted, there is no strict necessity to impose all of the symmetry relations at once. In the cases of a pilot field that is neither time-initial nor frequency-initial, the surrounding data symbols would have one of the following appearances:

$$\begin{array}{cccc} b_1 & a & b_2 & \\ c_1 & d_{n,k} & c_2 & \\ c_3 & d_{n+1,k} & \psi(c_1, c_2, c_3) & \\ b_3 & a & \phi(b_1, b_2, b_3) & \end{array} \quad (5)$$

$$\begin{array}{cccc} b_1 & c_1 & c_3 & b_3 \\ a & d_{n,k} & d_{n,k+1} & a \\ b_2 & c_2 & \rho(c_1, c_2, c_3) & \sigma(b_1, b_2, b_3) \end{array} \quad (6)$$

with functions $\psi$, $\varphi$, $\rho$, $\sigma$ as defined above, that is, linear combinations with predetermined coefficients. Hence, even if all symmetry relations are imposed, the cost for estimation does not exceed three data symbols per two pilot symbols.

In embodiments where one of the positions is populated with a data symbol given as a linear combination of two or three independent data symbols, it may be advantageous to assign such values to the independent data symbols that a cancellation of terms occurs in the linear combination. This means that effectively, a lower number of data symbols contribute to the linear combination, thereby avoiding transmitting at excessive power on one subcarrier. Such excessive transmit power, for which the transmitter may require a relatively costly amplifier with large dynamic range, may occur if the data symbols, when weighted by the coefficients of the linear combination, are approximately phase aligned. Data symbol assignments that cause a cancellation include:

First Data Symbol Assignment:
for ψ: $c_1=c_2$ or $c_1=c_3$ or $c_2=-c_3$; and/or
for φ: $b_1=b_2$ or $b_1=b_3$ or $b_2=-b_3$.

Second Data Symbol Assignment:
for ρ: $c_1=c_2$ or $c_1=-c_3$ or $c_2=c_3$; and/or
for σ: $b_1=-b_2$ or $b_1=b_3$ or $b_2=b_3$.

Third Data Symbol Assignment:
for η: b=0 or c=0, where 0 denotes zero transmission power or a neutral encoded value.

In each case, cancellation is achieved at the cost of losing one independent data symbol.

In embodiments specifying to the position of the pilot field relative to a transmission (e.g., frequency-initial, time-initial, neither frequency-initial nor time-initial), a transmission may be a scheduling unit of the communication system. In the context of 3GPP Long Term Evolution, for instance, a subframe (1 ms) or a resource element thereof is the normal scheduling unit, and different network entities may be allocated different subcarriers within one subframe. Hence, a "transmission" in the sense of the present disclosure may be (a resource element or, more generally, one or more subcarriers of) a subframe in which the first node is scheduled to transmit. This means that a frequency-initial or time-initial symbol will not experience significant inter-symbol interference from symbols by which it is preceded in frequency or time, respectively. Future radio technologies may apply similar scheduling units named by different terminology, or may apply different scheduling units. Either way, it will be within the abilities of one skilled in the art to associate "transmission" with an equivalent scheduling unit in such technologies, namely one providing an equivalent effect as (a resource element or one or more subcarriers of) a subframe. A scheduling unit may be regarded equivalent if the inter-symbol interference is reduced, insignificant or entirely absent at frequency-initial or time-initial positions of the transmission. In the downlink, there may be situations where no time-initial position exists: when a user is scheduled in one subframe, another user may be scheduled at the previous and next subframe, and the subframes allocated to other users may then interfere with one's own subframe.

Turning now to methods primarily aimed for implementation at the second node, one embodiment includes demodulating symbols in the predetermined field of the FBMC-modulated (e.g., FBMC/OQAM-modulated) signal that the second node receives from the first node. For purposes of channel estimation, it is sufficient to demodulate the symbols in the pilot field. Channel estimation is then performed on the basis of the demodulated symbols and of predetermined pilot symbols. In this embodiment, the pilot field comprises two positions which are either consecutive in frequency and coinciding in time, or two positions which are coinciding in frequency and consecutive in time. The pilot field may be populated with symbols which after demodulation are compared with the predetermined pilot symbols. Channel estimation may include reconstructing a real and an imaginary part of a symbol respectively from two demodulated symbols.

In one embodiment, the second node neglects interference. In particular, the second node may perform channel estimation while neglecting a contribution of inter-symbol interference to the demodulated symbols in the pilot field. For instance, the second node may perform channel estimation while assuming that the sum of the decoded signal for two frequency- or time-consecutive positions is given by one of the approximate equalities (3) and (4) above.

In one embodiment, the second node has knowledge of the symmetry relation(s) fulfilled by the data symbols with which the nearest neighbors of the pilot field are populated, and utilizes at least one of the symmetry relation(s) in demodulating the data symbols. Symmetry relations stipulating repetition, with same or different phase, of a data symbol are particularly useful for this purpose. A set of such data symbols, which may be regarded as a data stream with code rate<1, may be demodulated using per se known techniques for processing forward error correcting codes, including combining algorithms, possibly with minor adaptations within the abilities of the skilled person. This advantage may be regarded as a bonus effect of the efficient channel estimation techniques described above. The symmetry relations may be any of those described above.

Embodiments herein further include corresponding apparatus, computer programs, and computer program products. It is recalled that the invention relates to all combinations of features, even if these are recited in mutually different claims.

BRIEF DESCRIPTION OF THE DRAWINGS

Example embodiments of the invention will now be described in greater detail, with reference to the accompanying drawings, on which.

Unless otherwise indicated, the drawings show only such elements that are vital to the comprehension of the invention, whereas other elements may be implied or merely suggested.

DETAILED DESCRIPTION

Figure 1:
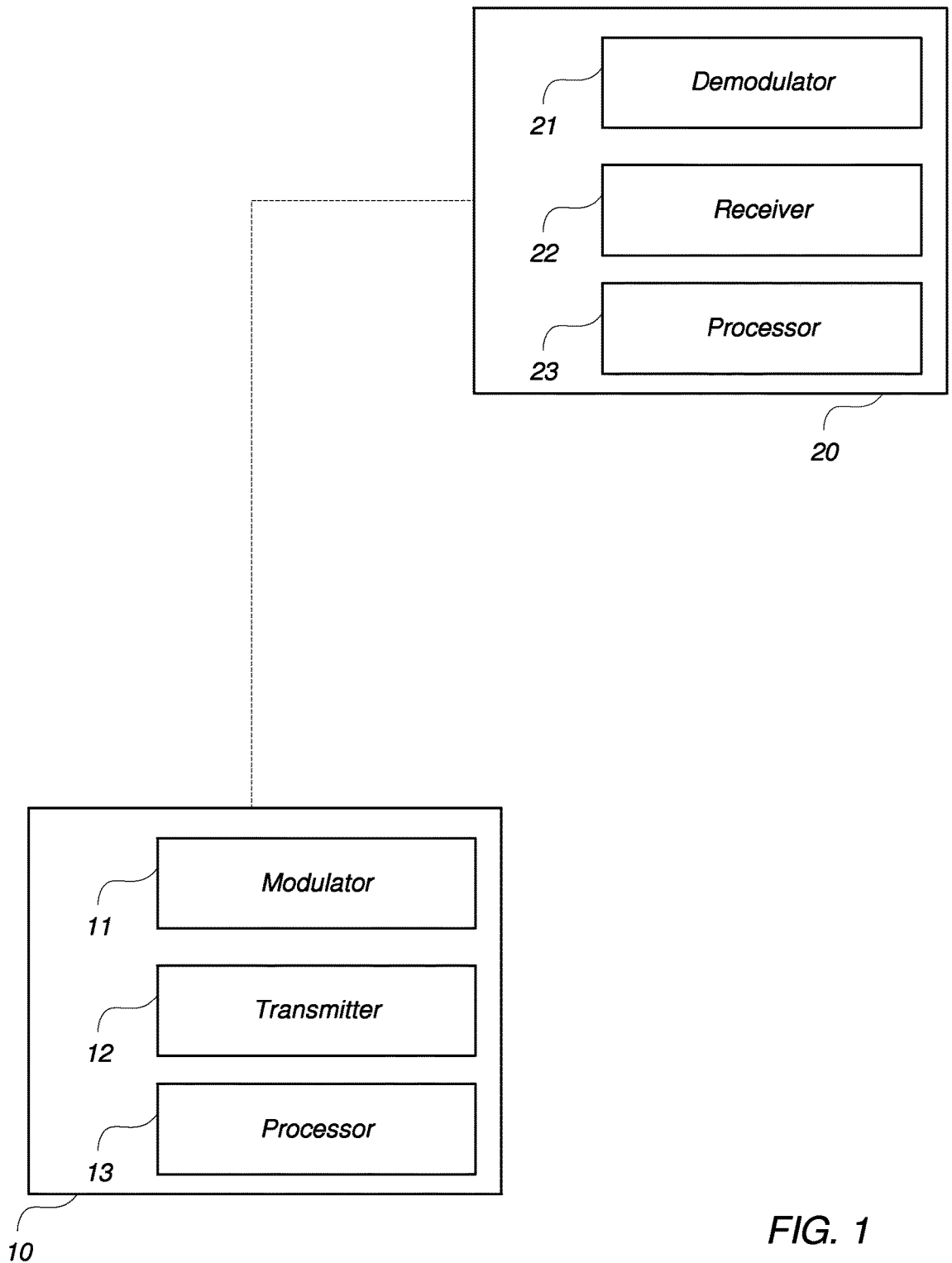
FIG. 1 illustrates two nodes of a wireless or wired communication system.

FIG. 1 illustrates an example communication network comprising a first node 10 and a second node 20 operative to communicate over a wired or wireless connection indicated by a dashed line on the drawing.

The first node 10 comprises a modulator 11 for FBMC-modulating a signal, a transmitter 12 for transmitting the FBMC-modulated signal to a second node, and a processor 13 configured to generate the signal to be modulated. For instance, the modulator may prepare a FBMC-modulated signal according to equation (1) on the basis of a set of symbols $\{d_{n,k}: 0 \le n \le N-1, 0 \le k \le K-1\}$. In order to enable channel estimation at a second node, the processor 13 may supply the modulator 11 with symbols in such manner that it generates a signal with a predetermined pilot field populated with two pilot symbols. In embodiments, the pilot symbols may be either consecutive in frequency and coinciding in time or coinciding in frequency and consecutive in time, and in that at least two nearest neighbors of the pilot field are populated with data symbols which fulfill a symmetry relation.

The second node 20 comprises a receiver 22 for receiving a FBMC-modulated symbol transmitted from the first node 10, a demodulator 21 for demodulating symbols in a predetermined pilot field of the received FBMC-modulated signal, and a processor 23 configured to perform channel estimation on the basis of the demodulated symbols and of predetermined pilot symbols. In embodiments, the pilot field is populated with two symbols which are either consecutive in frequency and coinciding in time or coinciding in frequency and consecutive in time.

Figure 2:
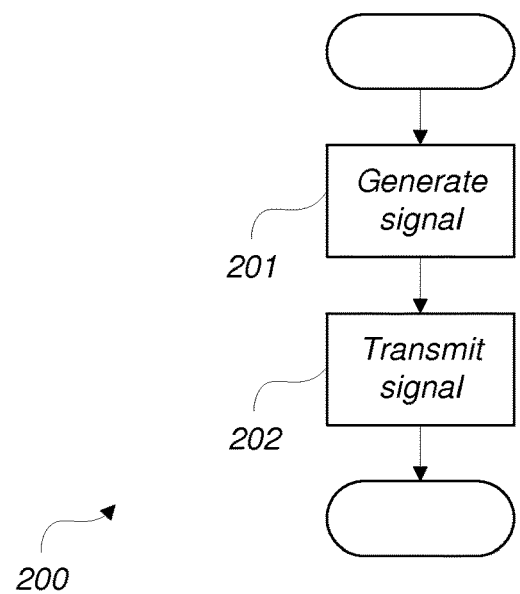
FIGS. 2 and 3 are flowcharts of methods related to channel estimation in a communication system.

FIG. 2 illustrates a method 200 suitable for implementation at the first node 10. The method includes an initial step 201 of generating a FBMC-modulated signal comprising data symbols and predetermined pilot symbols. In embodiments, the generated signal has a predetermined pilot field populated with two pilot symbols, which are either consecutive in frequency and coinciding in time or coinciding in frequency and consecutive in time, and at least two nearest neighbors of the pilot field are populated with data symbols which fulfill a symmetry relation. The initial step 201 may be implemented at the modulator 11 and the processor 13. In a second step 202, the FBMC-modulated signal is transmitted so as to enable channel estimation at a second node 20. The second step 202 may be implemented at the transmitter 12.

Figure 3:
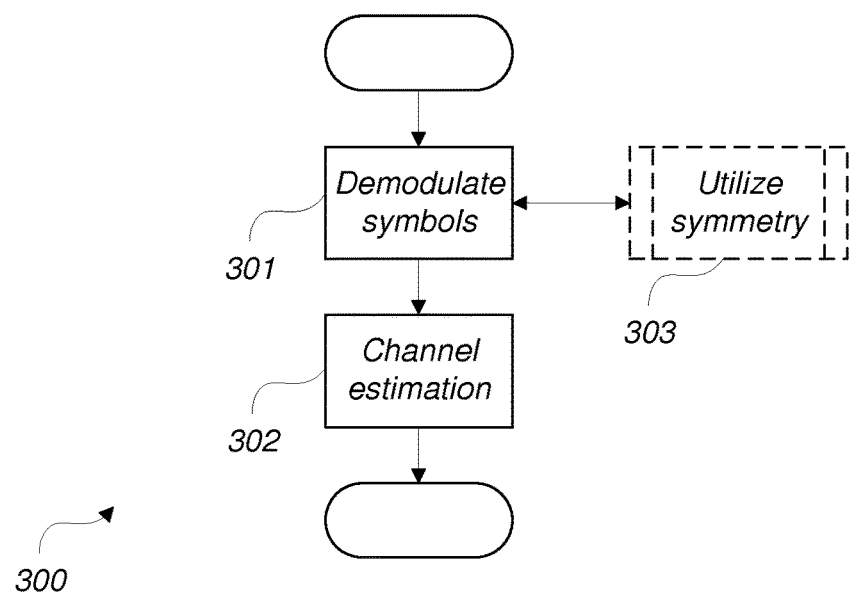

FIG. 3 illustrates a method 300 suitable for implementation at the second node 20. It includes an initial step 301 of demodulating symbols in a predetermined pilot field in a FBMC-modulated signal that the second node 20 has received. The initial step 301 may be implemented at the demodulator 21, possibly in cooperation with the receiver 22. The initial step 301 may include neglecting interference. In a second step 302, channel estimation is performed on the basis of the demodulated symbols and on the basis of predetermined pilot symbols. In embodiments, the pilot field is populated with two symbols which are either consecutive in frequency and coinciding in time or coinciding in frequency and consecutive in time. The second step 302 may be implemented at the processor 23.

In embodiments, the second step 302 may include an optional substep 303 of utilizing a symmetry relation which at least some of the data symbols are assumed to fulfill. Such symmetry relations have been described above and will be further discussed below.

The set of interference weights according to equation (2) were derived by calculations similar to those of Kofidis et al. (see above), pp. 2051-2052. The interference weights approximately describe observable and measurable phenomena which arise in connection with FBMC/OQAM modulation as a consequence of the laws of nature. Accordingly, by applying the symmetry relations resulting from calculations based on such interference weights, it is possible to generate an observable and measurable transmission with characteristics advantageous for channel estimation.

Introducing matrices C and I(n, k), respectively denoting transmitted symbols and interference weights around position (n, k), a nearest neighbor approximation of the demodulated signal at this position may be written as $$y_{n,k} \approx H\left(\sum_{\substack{|n'-n|\leq 1 \\ |k'-k|\leq 1}} I(n,k)_{n',k'} C_{n',k'}\right) + w_0$$

where $A_{i,j}$ denotes the element at position (i,j) of matrix A and $w_0$ is measurement noise.

For a pilot field with time-consecutive positions, the sum $y_{n,k}+y_{n+1,k}$ is of interest. Hence, interference weights $$I(n, k) = \begin{bmatrix} \vdots & \vdots & \vdots \\ \ldots & -\delta & -\beta & \delta & \ldots \\ \ldots & -\gamma & G_{n,k} & \gamma & \ldots \\ \ldots & -\delta & \beta & \delta & \ldots \\ \vdots & \vdots & \vdots \end{bmatrix},$$

$$I(n+1, k) = \begin{bmatrix} \vdots & \vdots & \vdots \\ \ldots & \delta & -\beta & -\delta & \ldots \\ \ldots & \gamma & G_{n+1,k} & -\gamma & \ldots \\ \ldots & \delta & \beta & -\delta & \ldots \\ \vdots & \vdots & \vdots \end{bmatrix}$$

are used. It easily verified that these weights applied to signal (5) will return the approximate equality (2). In the special case where the pilot field is frequency-initial in a transmission, the combination of all symmetry relations may correspond to setting the symbol matrix to $$C = \begin{bmatrix} \vdots & \vdots & \\ a & b & \ldots \\ d_{n,0} & c & \ldots \\ d_{n+1,0} & c & \ldots \\ a & b & \ldots \\ \vdots & \vdots & \end{bmatrix},$$

where symbols $d_{n,0}$, $d_{n+1,0}$ may be set to the real and the imaginary part of a complex pilot symbol. It is easily verified that approximate equality (2) holds in this case as well. As used herein, a transmission may be an LTE subframe or an equivalent segment.

For a pilot field with frequency-consecutive positions, the sum $y_{n,k}+y_{n,k+1}$ is of interest. It may be calculated on the basis of the following interference weights:

$$I(n, k) = \begin{bmatrix} \vdots & \vdots & \vdots \\ \ldots & -\delta & -\beta & \delta & \ldots \\ \ldots & -\gamma & G_{n,k} & \gamma & \ldots \\ \ldots & -\delta & \beta & \delta & \ldots \\ \vdots & \vdots & \vdots \end{bmatrix},$$

$$I(n, k+1) = \begin{bmatrix} \vdots & \vdots & \vdots \\ \ldots & -\delta & -\beta & \delta & \ldots \\ \ldots & -\gamma & G_{n,k+1} & \gamma & \ldots \\ \ldots & -\delta & \beta & \delta & \ldots \\ \vdots & \vdots & \vdots \end{bmatrix}.$$

It easily verified that these weights applied to signal (6) will return the approximate equality (3). In the special case where the pilot field is time-initial in a transmission, the combination of all symmetry relations may correspond to setting the symbol matrix to $$C = \begin{bmatrix} \ldots & a & d_{0,k} & d_{0,k+1} & a & \ldots \\ \ldots & b & c & -c & \eta(b,c) & \ldots \\ & \vdots & \vdots & \vdots & \vdots & \end{bmatrix},$$

whereby approximate equality (3) can be demonstrated to hold.

As seen above, the symmetry relations may involve linear combinations with predetermined coefficients of the independent data symbols, such as function η in the previous equation. In some embodiments, at least one of the independent data symbols is chosen in order for some terms of the linear combination to cancel.

As explained in previous sections, some embodiments include applying only a subset of all known symmetry relations. It may be determined based on a value of a signal quality metric what proportion of the nearest neighbors is to fulfill a symmetry relation.

It is noted that although terminology from 3GPP LTE has been used in this disclosure to exemplify embodiments herein, this should not be seen as limiting the scope of the embodiments to only the aforementioned system. Other wireless systems, including WCDMA, WiMAX, UMB and GSM, may also benefit from exploiting embodiments herein.

It is noted that the first node 10 and the second node 20 herein may correspond to any pair of nodes configured to transmit radio or other signals and otherwise interact in the way described. In one embodiment, though, the first node 10 comprises a base station (e.g., an eNodeB in LTE) or a relay node, whereas the second node 20 comprises a wireless communication device (e.g., a UE in LTE). Terminology such as eNodeB and UE should be considering non-limiting and does in particular not imply a certain hierarchical relation between the two. Furthermore, while the present detailed description is focused on wireless transmissions in the downlink, embodiments herein are equally applicable in the uplink.

In some embodiments, a non-limiting term UE is used. The UE herein can be any type of wireless device capable of communicating with a network node or another UE over radio signals. The UE may also be a radio communication device, target device, device to device (D2D) UE, machine-type UE or UE capable of machine-to-machine communication (M2M), a sensor or actuator equipped with an UE, tablet, mobile terminal, smart phone, laptop embedded equipped (LEE), laptop mounted equipment (LME), USB dongles, Customer Premises Equipment (CPE) etc.

Also in some embodiments generic terminology "base station" is used. This may refer to any kind of network node which may comprise of base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), or even core network node etc.

Embodiments herein also include a computer program comprising instructions which, when executed by at least one processor of a first 10 or second 20 node, cause the node to carry out any of the methods herein. In one or more embodiments, a carrier containing the computer program is one of communication media (or transitory media, such as an electronic signal, optical signal, radio signal) or computer readable storage media (or non-transitory media). The term computer storage media includes both volatile and nonvolatile, removable and non-removable media implemented in any method or technology for storage of information; computer storage media includes but is not limited to RAM, ROM, EEPROM, flash memory or other memory technology, CD-ROM, digital versatile disks or other optical disk storage, magnetic cassettes, magnetic tape, magnetic disk storage or other magnetic storage devices, or any other medium which stores the desired information and is accessible by a computer.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method implemented in a first node of a communication system employing filter bank multi-carrier (FBMC) modulation with a real symmetric pulse, comprising:
   transmitting a FBMC-modulated signal comprising data symbols and predetermined pilot symbols, to enable channel estimation at a second node,
   wherein the signal has a predetermined pilot field populated with two pilot symbols, which are either consecutive in frequency and coinciding in time or coinciding in frequency and consecutive in time, and at least two nearest neighbors of the pilot field are populated with data symbols which fulfil a symmetry relation, said symmetry relation being selected from a group comprising:
      the nearest neighbors which precede and succeed the pilot field in its longitudinal direction are populated with a same data symbol; or
      when the pilot field is neither frequency-initial nor time-initial in a transmission and the pilot symbols are consecutive in time, the nearest neighbors, which are adjacent to the pilot field in frequency and coinciding with the pilot field in time, are populated with three independent data symbols and one data symbol which is given by a function of the three independent data symbols.

2. The method of claim 1, wherein the group further comprises:
   when the pilot field is frequency-initial in a transmission and the pilot symbols are consecutive in time, the nearest neighbors, which are adjacent to the pilot field in frequency and coinciding with the pilot field in time, are populated with the same data symbol.

3. The method of claim 1, wherein the group further comprises:
   when the pilot field is frequency-initial in a transmission and the pilot symbols are consecutive in time, the nearest neighbors, which are adjacent to the pilot field in both frequency and time, are populated with the same data symbol.

4. The method of claim 1, wherein the group further comprises:
   when the pilot field is time-initial in a transmission and the pilot symbols are consecutive in frequency, the nearest neighbors, which are coinciding with the pilot field in frequency and adjacent to the pilot field in time, are populated with data symbols of equal magnitudes and opposite phases.

5. The method of claim 4, wherein the nearest neighbors, which are adjacent to the pilot field in both frequency and time, are populated with one independent data symbol and one data symbol which is given by a function of said independent data symbol and of the data symbols which populate said nearest neighbors coinciding with the pilot field in frequency and being adjacent to the pilot field in time.

6. The method of claim 1, wherein the group further comprises:
when the pilot field is neither frequency-initial nor time initial in a transmission, and the pilot symbols are consecutive in frequency, the nearest neighbors, which are coinciding with the pilot field in frequency and adjacent to the pilot field in time, are populated with three independent data symbols and one data symbol which is given by a function of the three independent data symbols.

7. The method of claim 1, wherein the function of the three independent data symbols is a linear combination with predetermined coefficients.

8. The method of claim 7, wherein at least one of the independent data symbols is chosen in order for some terms of the linear combination to cancel.

9. The method of claim 1, wherein the transmission is a Long Term Evolution subframe or an equivalent segment.

10. The method of claim 1, further comprising a preceding step of determining, on the basis of a value of a signal quality metric, what proportion of the nearest neighbors is to fulfil the symmetry relation.

11. The method of claim 1, wherein the two pilot symbols are real and imaginary parts of a complex pilot symbol.

12. A method implemented in a second node of a communication system employing filter bank multi-carrier (FBMC) modulation with a real symmetric pulse, comprising:
demodulating symbols in a predetermined pilot field in a FBMC-modulated signal received from a first node; and
performing channel estimation on the basis of the demodulated symbols and of predetermined pilot symbols, wherein the pilot field is populated with two symbols, which are either consecutive in frequency and coinciding in time or coinciding in frequency and consecutive in time, and wherein at least two nearest neighbors of the pilot field are populated with data symbols which fulfil a symmetry relation, said symmetry relation being selected from a group comprising:
the nearest neighbors which precede and succeed the pilot field in its longitudinal direction are populated with a same data symbol; or when the pilot field is neither frequency-initial nor time-initial in a transmission and the pilot symbols are consecutive in time, the nearest neighbors, which are adjacent to the pilot field in frequency and coinciding with the pilot field in time, are populated with three independent data symbols and one data symbol which is given by a function of the three independent data symbols; and
demodulating the data symbols constituting the at least two nearest neighbors of the pilot field using the symmetry relation between the data symbols.

13. The method of claim 12, wherein the channel estimation comprises neglecting interference.

14. The method of claim 12, wherein the demodulating of symbols in the pilot field includes reconstructing a real and an imaginary part of a symbol.

15. A first node adapted to operate in a communication system employing filter bank multi-carrier (FBMC) modulation with a real symmetric pulse, comprising:
a modulator for FBMC-modulating a signal comprising data symbols and predetermined pilot symbols; and
a transmitter for transmitting the FBMC-modulated signal to enable channel estimation at a second node,
a processor configured to generate the signal with a predetermined pilot field populated with two pilot symbols, which are either consecutive in frequency and coinciding in time or coinciding in frequency and consecutive in time, and in that at least two nearest neighbors of the pilot field are populated with data symbols which fulfil a symmetry relation, said symmetry relation being selected from a group comprising:
the nearest neighbors which precede and succeed the pilot field in its longitudinal direction are populated with a same data symbol; or
when the pilot field is neither frequency-initial nor time-initial in a transmission and the pilot symbols are consecutive in time, the nearest neighbors, which are adjacent to the pilot field in frequency and coinciding with the pilot field in time, are populated with three independent data symbols and one data symbol which is given by a function of the three independent data symbols.

16. A second node adapted to operate in a communication system employing filter bank multi-carrier (FBMC) modulation with a real symmetric pulse, comprising:
a receiver for receiving a FBMC-modulated signal from a first node;
a demodulator for demodulating symbols in a predetermined pilot field in the received FBMC-modulated signal; and
a processor configured to perform channel estimation on the basis of the demodulated symbols and of predetermined pilot symbols, wherein the pilot field is populated with two symbols, which are either consecutive in frequency and coinciding in time or coinciding in frequency and consecutive in time, and wherein at least two nearest neighbors of the pilot field are populated with data symbols which fulfil a symmetry relation, said symmetry relation being selected from a group comprising:
the nearest neighbors which precede and succeed the pilot field in its longitudinal direction are populated with a same data symbol; or
when the pilot field is neither frequency-initial nor time-initial in a transmission and the pilot symbols are consecutive in time, the nearest neighbors, which are adjacent to the pilot field in frequency and coinciding with the pilot field in time, are populated with three independent data symbols and one data symbol which is given by a function of the three independent data symbols; and
wherein the demodulator is configured to demodulate the data symbols constituting the at least two nearest neighbors of the pilot field using the symmetry relation between the data symbols.

* * * * *